Dec. 25, 1945.   W. T. MELVIN ET AL   2,391,730
LUBRICATING ARRANGEMENT FOR POWER DRIVEN SAWS
Filed Jan. 6, 1943   2 Sheets-Sheet 1
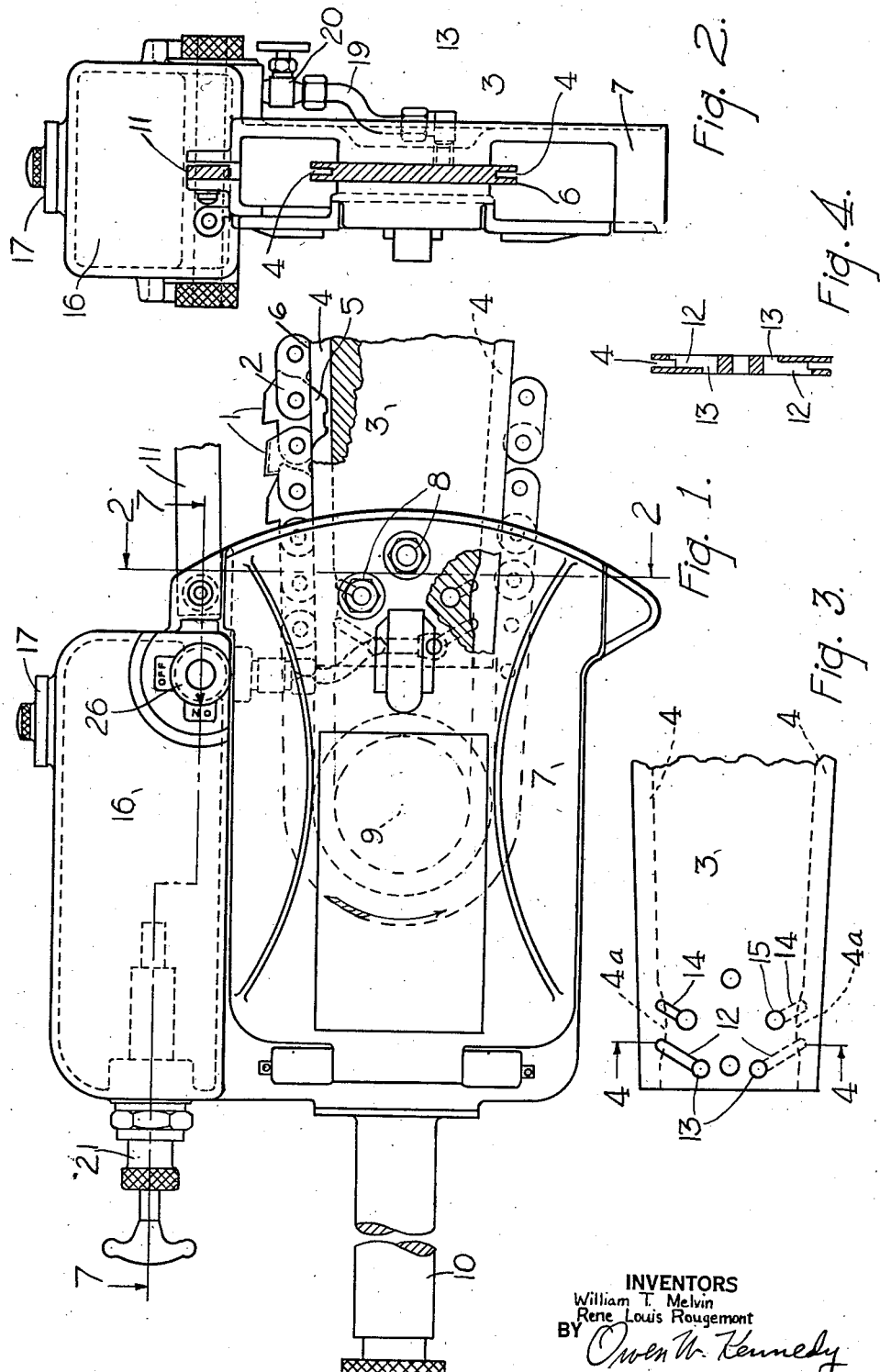
INVENTORS
William T. Melvin
Rene Louis Rougemont
BY Owen W. Kennedy
ATTORNEY Dec. 25, 1945. W. T. MELVIN ET AL 2,391,730
LUBRICATING ARRANGEMENT FOR POWER DRIVEN SAWS
Filed Jan. 6, 1943 2 Sheets-Sheet 2
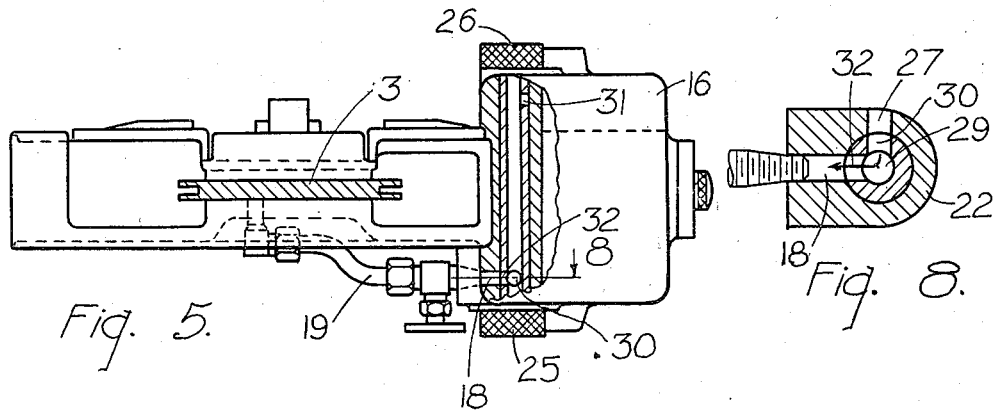
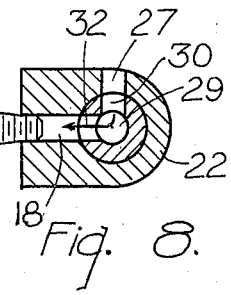
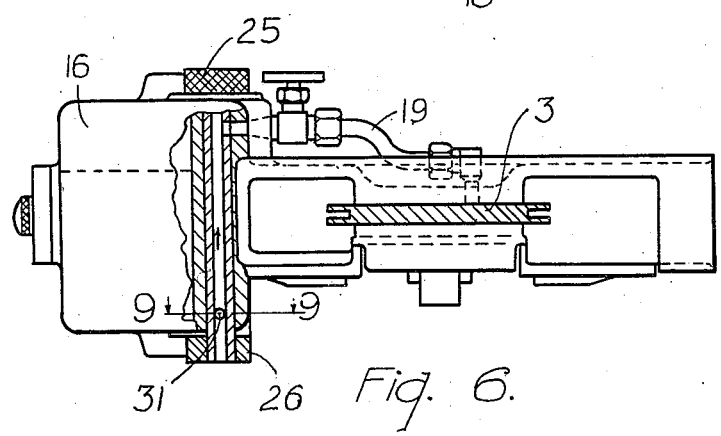
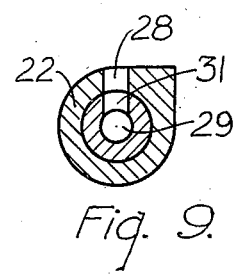
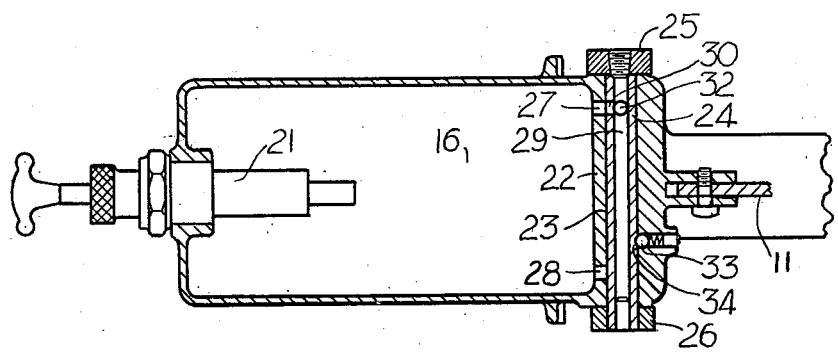
INVENTORS
William T. Melvin
Rene Louis Rougemont
BY Owen N. Kennedy
ATTORNEY

Patented Dec. 25, 1945

2,391,730

UNITED STATES PATENT OFFICE 2,391,730

LUBRICATING ARRANGEMENT FOR POWER DRIVEN SAWS

William T. Melvin and Renè Louis Rougemont, Worcester, Mass., assignors to Reed-Prentice Corporation, Worcester, Mass., a corporation of Massachusetts Application January 6, 1943, Serial No. 471,432

2 Claims. (Cl. 143—32)

The present invention relates to power driven saws, particularly chain saws, of the type wherein the cutting teeth are pivotally connected by links, with the whole chain traveling around a rigid cutter bar providing a groove in which portions of the links travel.

Due to the speed at which the chain travels, and the large amount of wood chips and waste picked up by the cutting teeth, it of the utmost importance that the parts of the chain be continuously lubricated while in operation, and the present invention aims at the accomplishment of this result. In carrying out the invention, one end of the cutter bar around which the chain moves, is so constructed as to provide passages for the flow of lubricant, so formed that they will not readily become clogged with sawdust and waste carried along by the chain itself. Furthermore, these passages are connected to the supply of lubricant, in such a manner that there will be an ample flow of lubricant to the passages in any position in which the saw may be used.

The above and other advantageous features of the invention will hereinafter more fully appear from the following description considered in connection with the accompanying drawings, in which:

Fig. 1 is a view in side elevation of the end portion of a power driven saw chain embodying the lubricating arrangement of the present invention.

Fig. 2 is a vertical sectional view along the line 2—2 of Fig. 1, looking in the direction of the arrows.

Fig. 3 is a fragmentary view of a portion of the cutter bar removed from the assembly of Fig. 1.

Fig. 4 is a sectional view along the line 4—4 of Fig. 3.

Figs. 5 and 6 are schematic views, partially in section, illustrating different positions of the valve for controlling the flow of lubricant to the saw.

Fig. 7 is a fragmentary section along the line 7—7 of Fig. 1, looking in the direction of the arrows.

Figs. 8 and 9 are sections through the valve ports in Figs. 5 and 6, on an enlarged scale, said sections being taken along the lines 8—8 and 9—9 respectively.

Like reference characters refer to like parts in the different figures.

Referring to the drawings, a portion of a chain saw is shown as consisting of a series of teeth 1 pivotally connected by links 2, with the entire chain being adapted to travel around a cutter bar 3. Each side of the cutter bar 3 provides a slot 4, in which driving portions 5 of the teeth 1 travel, with the links 2 riding on surfaces 6 of the bar 3 on opposite sides of the slot 4.

The chain is adapted to be driven by means of a sprocket connected to any suitable source of power, not shown, with the teeth of the sprocket engaging the driving portions 5 of the links 1. The particular form of the chain and driving sprocket forms no part of the present invention, which is concerned with an improved arrangement for lubricating the parts of the chain at its outer or "helpers" end, i. e., the end remote from the driving sprocket, where the usual lubricating means associated with the driven end of the chain is not effective. For that reason, only the outer end of the chain and cutter bar is shown in detail.

The outer end of the cutter bar 3 carries a bracket 7, secured to the cutter bar by the bolts 8, and the bracket 7 serves to support an idler sprocket 9, around which the chain saw passes in its travel from one side of the cutter bar to the other. The end bracket 7 provides a handle 10, by means of which the saw may be held and manipulated to present one side of the saw to the work. Normally, only one side of the saw is used for cutting, and in order to prevent injury by contact with the non-cutting side of the saw, a guard bar 11 extends from one side of the bracket to the driven end of the saw. Therefore it is often necessary to turn over the entire saw, in order to present the cutting side to the work, and the present invention provides for effective lubrication of the links of the chain saw, irrespective of which side of the frame 7 is uppermost when cutting.

As best shown in Fig. 3, wherein the cutter bar 3 has been removed from the frame 7, it will be seen that the slots 4 on the opposite sides of the bar provide depressions 4a, which are considerably below the path of movement of the driving portions 5, as the latter travel through the cutter bar slots. These depressions 4a are in communication with slots 12 extending inwardly from either side of the bar, and connecting with openings 13 extending through the bar. It is evident from Fig. 4 that the slots 12 are formed in opposite faces of the bar, so that one slot or the other is uppermost, irrespective of which side of the saw is presented to the work. Additional slots 14 are also provided in communication with openings 15 through which the bolts 8 extend.

For the purpose of supplying lubricant to the cutter bar slots 4, the bracket is formed with a reservoir 16, into which the lubricant may be placed through an opening provided with a cap 17. One end of the reservoir provides a discharge opening 18, from which leads a pipe 19 extending outside the bracket 7 and connected at its opposite end to one of the cross openings 13. The pipe 19 provides a suitable valve 20, by means of which the flow of lubricant can be shut off from the reservoir when the saw is not in use.

As previously pointed out, it is one of the objects of the present invention to insure an adequate supply of lubricant to the saw in any position in which the saw may be used. To this end, the reservoir 16 provides a hand pump 21 for placing the interior of the reservoir under pressure, and a valve arrangement for delivering the lubricant under pressure to the chain saw, irrespective of whether the feed pipe 19 is above or below the cutter bar 3, as indicated diagrammatically in Figs. 5 and 6.

As best shown in Fig. 7, the end of the reservoir 16 opposite to the pump 21, provides a housing 22 having a cylindrical bore 23, in which is turnable a valve stem 24. The ends of the stem 24 project beyond the sides of the reservoir 16, and are provided with operating knobs 25 and 26, by means of which the stem 24 may be turned. The housing 22 provides ports 27 and 28 at opposite ends, and these ports are adapted to be placed in communication with a longitudinal passage 29 extending through the stem by radial ports 30 and 31 at opposite ends of the passage 29. A third radial port 32 lies in the same plane as the port 30, and is at right angles thereto, see Figs. 5 and 8.

In order to hold the valve stem 24 in different angular positions, wherein its ports will be in register with the ports of the housing, a spring pressed ball 33 is adapted to be received in notches 34, the angular displacement of which corresponds to the displacement of the respective ports 30, 31 and 32 around the axis of the stem 24, see Fig. 7. The particular position which stem 24 may occupy is indicated by a pointer on each knob 25 and 26, such pointers being movable with respect to suitable indicia on each side of the reservoir 16, to indicate whether or not the flow of lubricant is "on" or "off," depending upon which side of the saw is uppermost. Thus, when the saw is in the position of Fig. 5, with the lubricant pipe 19 lowermost, the knob 26 will be turned to bring its pointer to register with "on," see Fig. 1. In this position of the valve stem, the port 27 will be in direct communication with both ports 30 and 32, and since the discharge opening 18 is in communication with port 32, a flow of lubricant will take place through these ports under the pressure within the reservoir above the surface of the lubricant, as indicated by the arrows in Fig. 8.

However, when the saw is turned over to bring the pipe 19 uppermost, as shown in Fig. 6, the level of the lubricant will be below the port 27. This condition will be indicated by the fact that the knob 25 which is then uppermost, will indicate that the flow of lubrication is "off." To remedy this condition, the operator of the saw then turns the knob 25 to bring its pointer in register with "on." This turning of the valve stem 24 results in registering the port 31 with the then lowermost port 28 of the housing, see Fig. 9, in which position of the stem the port 30 is turned out of register with the upper port 27. The pressure on the surface of lubricant in the reservoir 16 then causes the lubricant to be forced inwardly through registered ports 28 and 31, and then upwardly along the valve stem passage 29. Since the valve stem port 30 has previously been moved into register with the discharge opening 18, the pipe 19 will be connected to a source of lubricant under pressure, just as it was when the saw was in the opposite position, with the pipe 19 lowermost.

With the saw operating in the position of Fig. 1, i. e. with the cutter bar 3 in a vertical plane, lubricant will be supplied to the pipe 19 irrespective of the position then occupied by the knobs 25 and 26. This is because the level of the lubricant in the reservoir 16 is above both parts 27 and 28, so that lubricant can enter the valve stem passage 29 through whichever port 30 or 31 happens to be in register with its associated port 27 or 28.

It is therefore apparent that with the saw operating in the positions of either Fig. 1, 5 or 6 (assuming the knobs 25 and 26 to have been properly operated), lubricant from the reservoir 16 will be delivered by the pipe 19 to the opening 13 in the cutter bar 3. From here it will flow through the slot 12 to the depression 4a in the chain slot 4. Therefore, lubricant will be continuously supplied to the slot 4 as the chain links move therein, with a considerable accumulation of lubricant in the depressions 4a. Due to the open form of the slots 12, as shown in Fig. 4, there is no tendency for the slots to become clogged by waste material carried along by the saw. Nor will there be any tendency for movement of the saw teeth through the cutter bar slot to jam waste material into the lubricating passages, owing to the fact that the bottom of each depression 4a is located a considerable distance from the lower edges of the driving portions 5, as the latter move past the depressions. Any tendency for chips and waste to collect as a mass in a depression 4a, will result in building up the mass until it reaches above the bottom of the slot 4, whereupon the driving portion 5 of a saw link will pull the mass out of the slot.

We claim:

1. A lubricating arrangement for chain saws comprising, in combination, a cutter bar, a chain saw driven thereon, a lubricant reservoir offset from one end of said cutter bar, said reservoir providing spaced side walls, connections extending between said reservoir and one side of said cutter bar, means for maintaining lubricant within said reservoir under pressure, ports at opposite sides of said reservoir leading to said connections, a valve member extending entirely across and within said reservoir providing passages for conducting lubricant to the saw through one or the other of said ports and connections, in accordance with which port is below the level of lubricant within the reservoir, said valve member also extending through both side walls of said reservoir, and an operating member on each end of said valve member, outside the corresponding side wall, for turning said valve member into different positions.

2. A lubricating arrangement for chain saws comprising, in combination, a cutter bar, a chain saw driven thereon, a lubricant reservoir offset from one end of said cutter bar, said reservoir providing spaced side walls, connections extending between said reservoir and one side of said cutter bar, means for maintaining lubricant within said reservoir under pressure, ports at opposite sides of said reservoir leading to said connections, a valve member extending entirely across and within said reservoir providing passages for conducting lubricant to the saw through one or the other of said ports and connections, in accordance with which port is below the level of lubricant within the reservoir, said valve member also extending through both side walls of said reservoir, and an operating member on each end of said valve member, outside the corresponding side wall, for turning said valve member into different positions, each valve operating member providing suitable indicia to show the direction of lubricant flow through the associated valve member.

WILLIAM T. MELVIN.
RENÈ LOUIS ROUGEMONT.